(12) United States Patent
Lee

(10) Patent No.: US 7,097,380 B2
(45) Date of Patent: Aug. 29, 2006

(54) POSITIONING STRUCTURE OF A BEACH UMBRELLA

(76) Inventor: Youth Lee, 13F, No. 232, Sec. 3, Ba Der Road, Taipei (TW)

(*) Notice: Subject to any disclaimer, the term of this patent is extended or adjusted under 35 U.S.C. 154(b) by 71 days.

(21) Appl. No.: 10/780,654

(22) Filed: Feb. 19, 2004

(65) Prior Publication Data

US 2005/0186023 A1  Aug. 25, 2005

(51) Int. Cl.
*A01K 97/10* (2006.01)
*A45B 19/04* (2006.01)

(52) U.S. Cl. .............. 403/109.2; 403/109.3; 403/109.6; 403/378; 15/15; 15/16; 15/80; 15/81

(58) Field of Classification Search ........... 403/109.1, 403/109.3, 109.6, 377, 378, 108, 379.5; 135/15, 135/16, 80, 81; 248/530, 533, 407–409
See application file for complete search history.

(56) References Cited

U.S. PATENT DOCUMENTS

| | | | | |
|---|---|---|---|---|
| 487,544 A | * | 12/1892 | Simon | 296/107.14 |
| 1,726,372 A | * | 8/1929 | Stoll | 248/601 |
| 4,033,599 A | * | 7/1977 | Fusco | 280/851 |
| 4,459,787 A | * | 7/1984 | Wilcox | 135/15.1 |
| 4,577,837 A | * | 3/1986 | Berg et al. | 403/108 |
| 4,832,304 A | * | 5/1989 | Morgulis | 135/16 |
| 5,457,918 A | * | 10/1995 | Plourde | 248/545 |
| 5,625,923 A | * | 5/1997 | Huang | 16/429 |
| 5,881,495 A | * | 3/1999 | Clark | 248/530 |
| 6,199,569 B1 | * | 3/2001 | Gibson | 135/16 |
| 6,234,509 B1 | * | 5/2001 | Lara | 403/109.3 |
| 6,330,887 B1 | * | 12/2001 | Chen | 135/16 |
| 6,575,656 B1 | * | 6/2003 | Suh | 403/109.6 |

FOREIGN PATENT DOCUMENTS

| | | | | | |
|---|---|---|---|---|---|
| DE | 2640610 A | * | 3/1978 | | 248/218.4 |
| GB | 2020967 A | * | 11/1979 | | |

* cited by examiner

*Primary Examiner*—Daniel P. Stodola
*Assistant Examiner*—Ernesto Garcia
(74) *Attorney, Agent, or Firm*—Rosenberg, Klein & Lee

(57) ABSTRACT

A positioning structure of a beach umbrella is provided that includes a positioning apparatus to connect with a lower tube of the umbrella. The apparatus has a flat plate for forcing the lower tube being inserted into ground easily. A handle has a rod to engage with apertures on the tubes of the shaft that can adjust the height of the beach umbrella as desired for increasing utility.

3 Claims, 5 Drawing Sheets

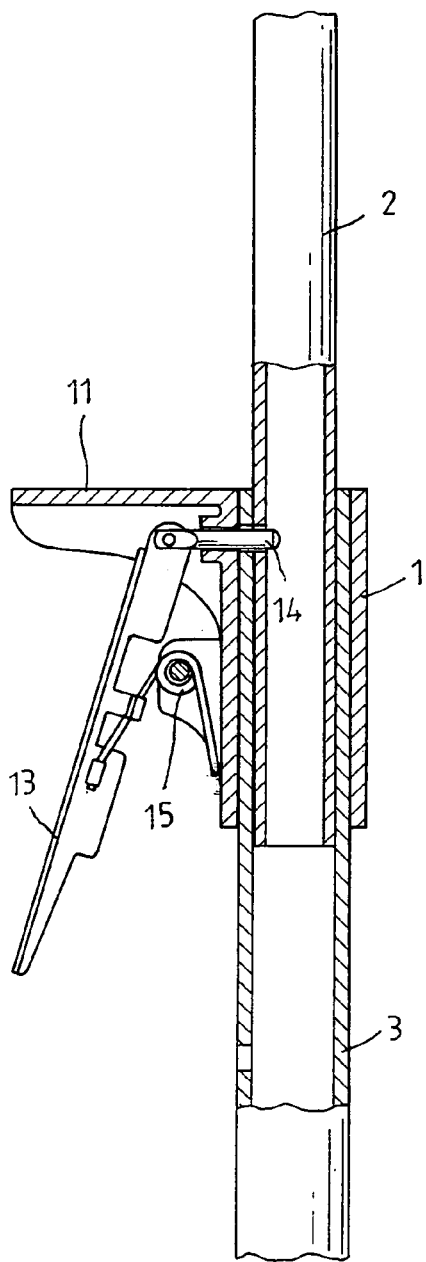
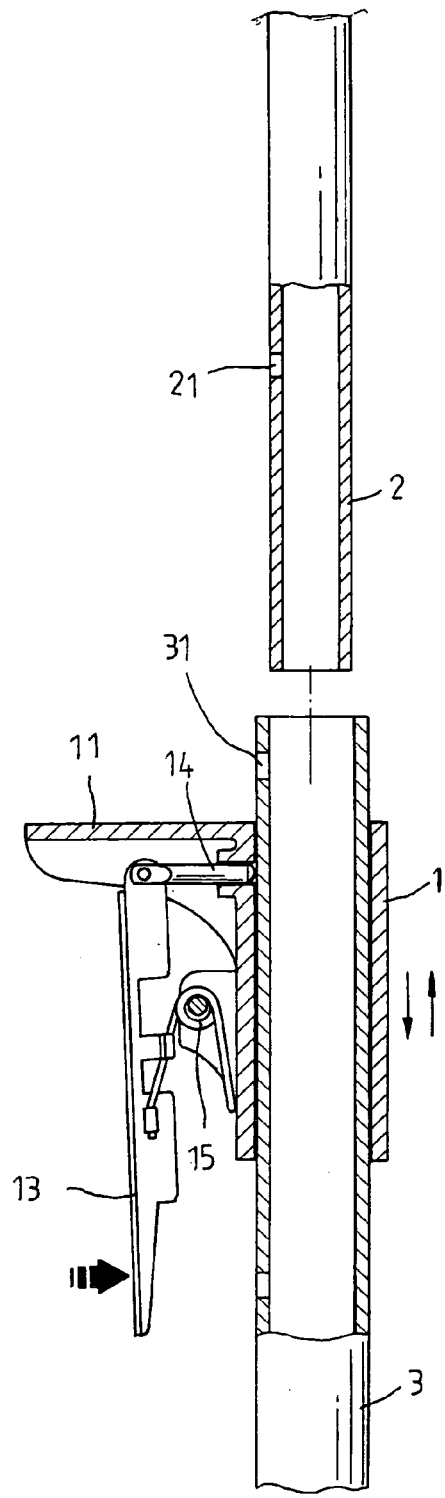
F I G. 4
F I G. 3

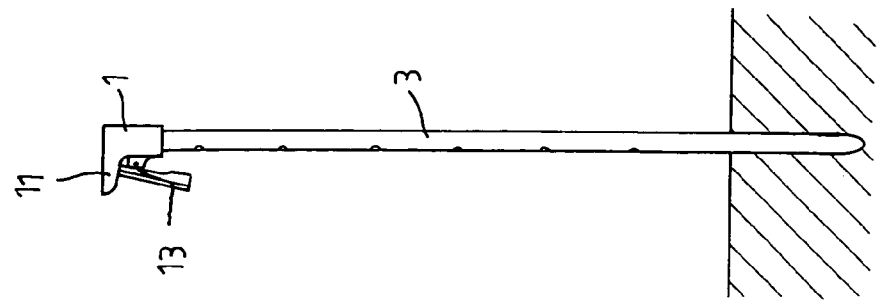
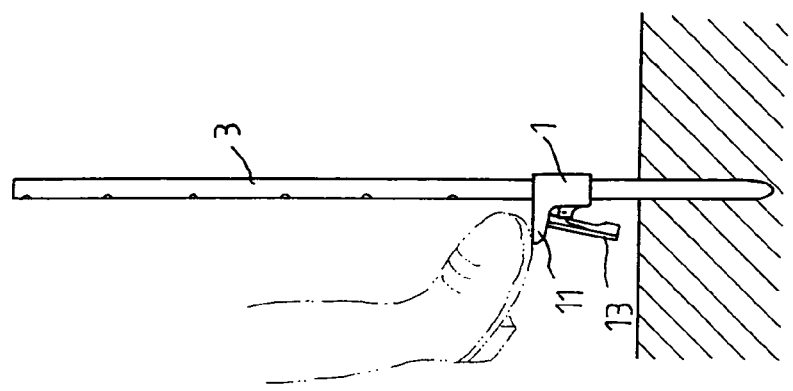
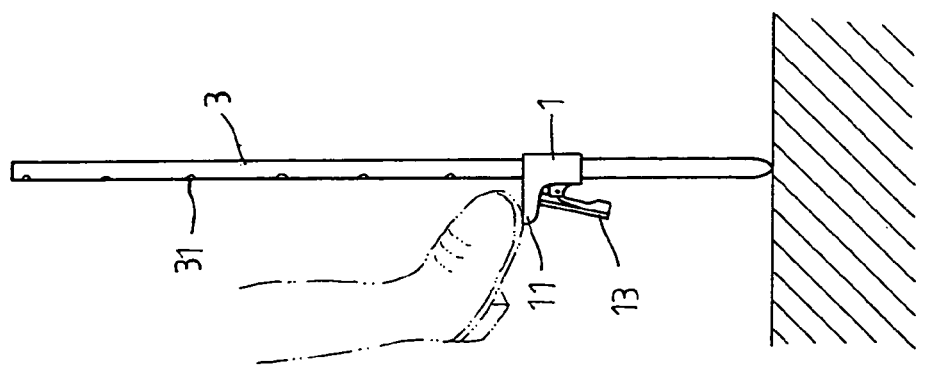

POSITIONING STRUCTURE OF A BEACH UMBRELLA

BACKGROUND OF THE INVENTION

A conventional beach umbrella usually includes a shaft and a frame set, wherein the shaft is composed of an upper tube and a lower tube to insert into sand or earth for standing and being used. Since the beach umbrella is used at beach, where the wind is always strong, it should be positioned on ground for resisting the wind. But it is very difficult to insert the shaft of the umbrella into the ground in stable. Moreover, the shaft includes the upper tube and the lower tube, both of which are connected together by compression that will be easily loosened when strong wind blows.

The present invention is to provide a positioning structure of a beach umbrella, which includes a positioning apparatus to engage with the upper tube and the lower tube of the shaft firmly. And the umbrella can be positioned at beach in ease by use of the positioning apparatus that overcomes the drawback of prior arts. Now, accompanying with the following drawings, the character of the present invention will be described here and after.

BRIEF DESCRIPTION OF THE DRAWINGS

FIG. 3 is a cross-sectional plan view showing the positioning apparatus being assembled with lower tube of the shaft.

FIG. 4 is an assembled plan view of FIG. 3.

FIGS. 5 to 7 are plan views showing positioning procedures of the beach umbrella according to the present invention.

DETAILED DESCRIPTION OF THE PREFERRED EMBODIMENT

Figure 1:
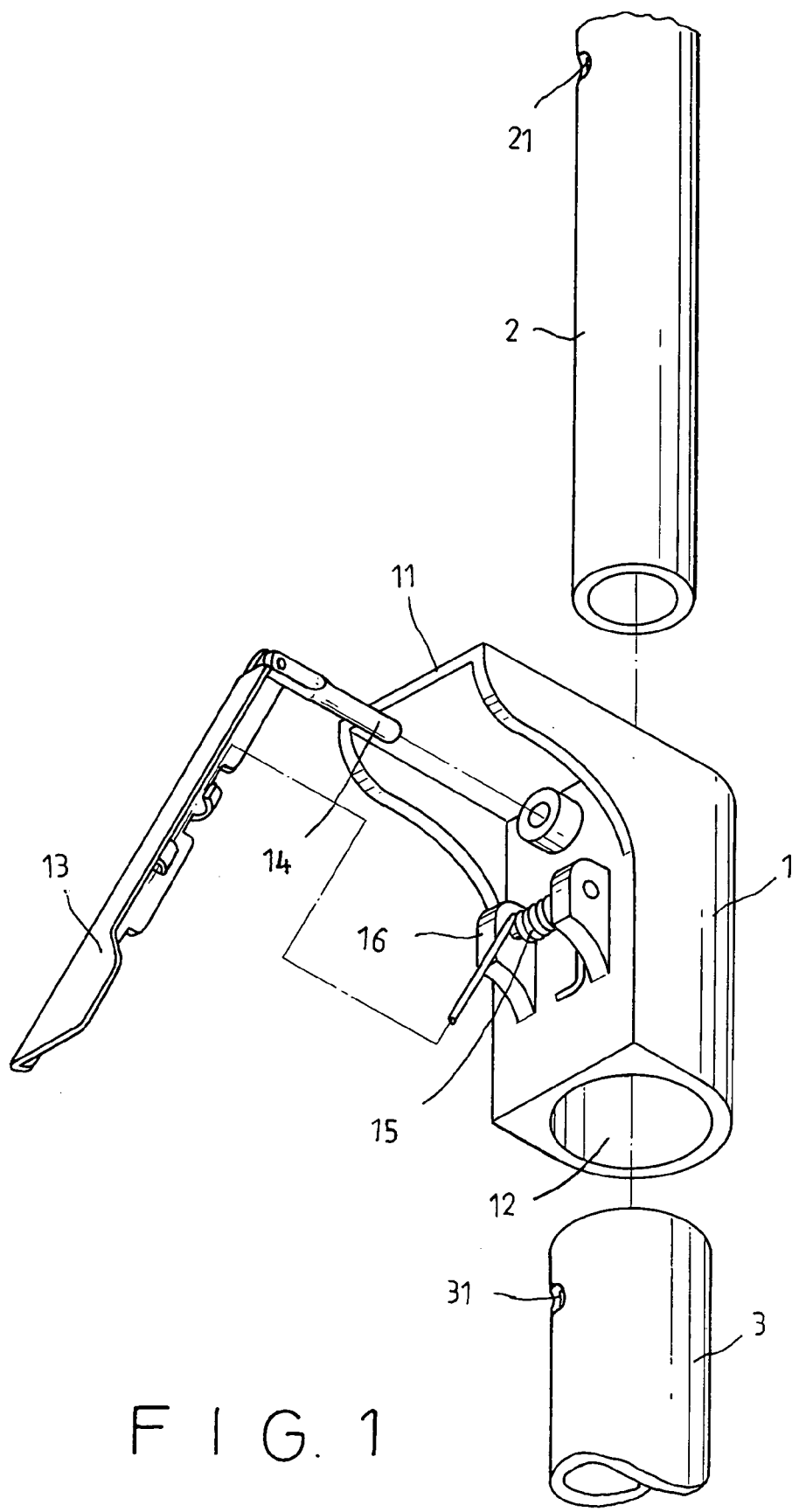
FIG. 1 is a perspective view showing a positioning apparatus and a shaft of a beach umbrella according to the present invention.
Figure 2:
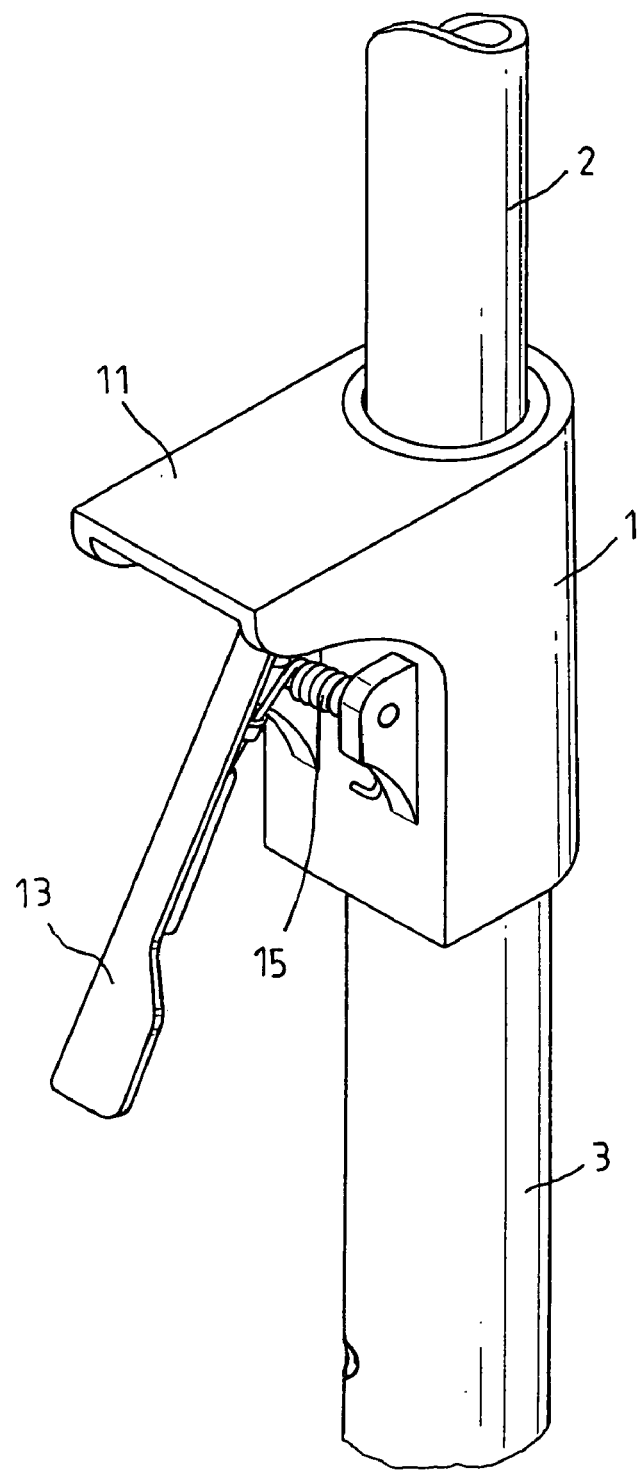
FIG. 2 is a perspective view showing the positioning apparatus being assembled with the shaft of the umbrella according to the present invention.

Referring to FIG. 1 to 4, the present invention relates to a beach umbrella, which has a shaft including an upper tube (2) and a lower tube (3), both with several interval positioned apertures (21), (31) thereon. A positioning apparatus (1) is provided to connect the two tubes together, which has a flat plate (11), a joint (16) with a spring (15) on one side to connect with a handle (13) and to provide elastic force for pushing a rod (14) on top of the handle (13) into central hole (12) of the apparatus (1). As the upper tube (2) and the lower tube (3) are received in the central hole (12) of the positioning apparatus (1), the rod (14) can penetrate one aperture (21) and a relating aperture (31) to position both tubes at the certain position. Hence, the height of the beach umbrella can be determined in secure, wherein both tubes (2), (3) are never loosened.

Figure 8:
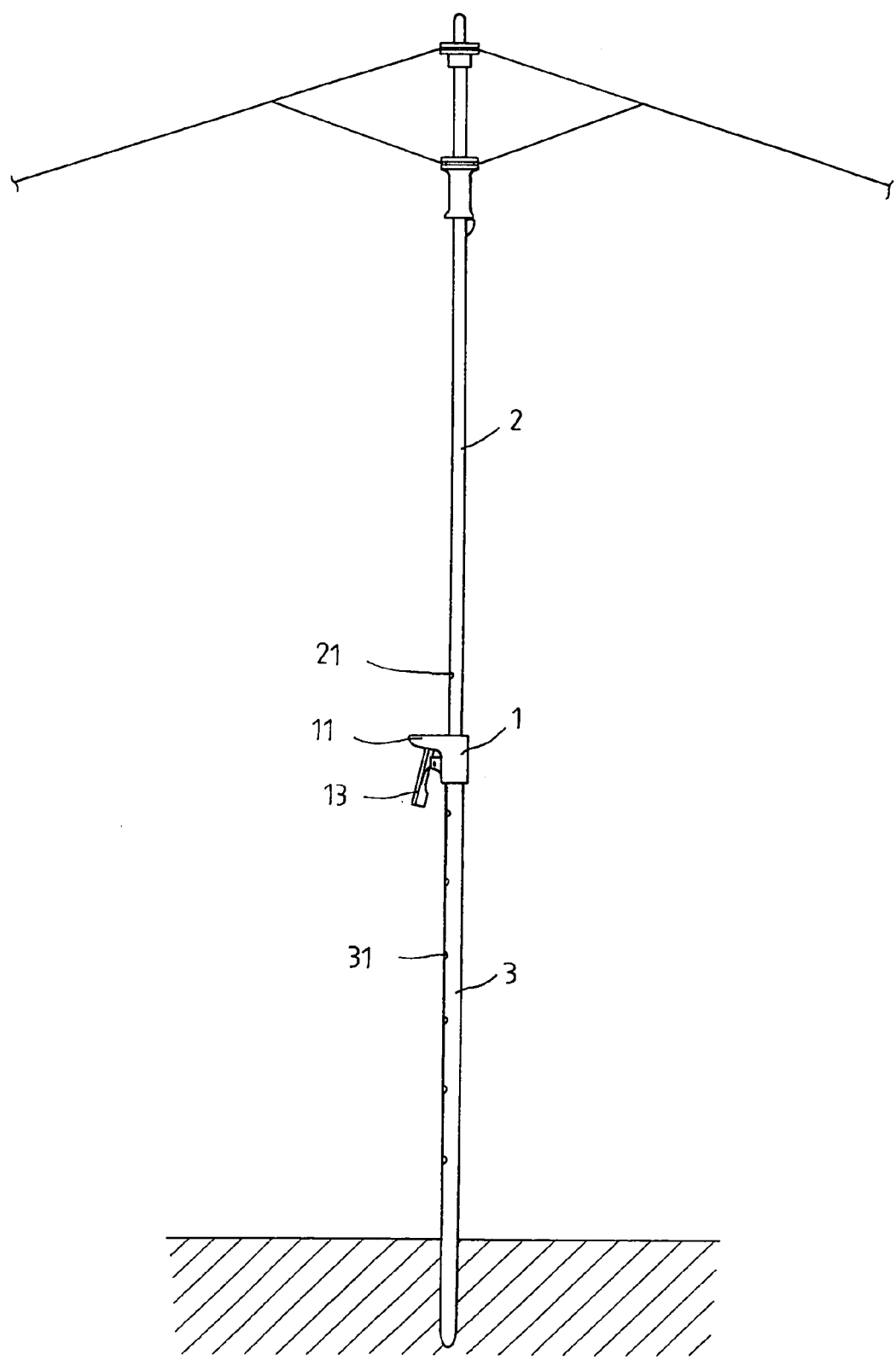
FIG. 8 is a plan view showing a true embodiment of the present invention.

When to insert the lower tube (3) into ground of beach, sand or earth, as shown in FIG. 5 to 7, the positioning apparatus (1) is connected at lower portion of the lower tube (3) firstly. People can use foot to place on the flat plate (11) to force the lower tube (3) inserting into ground very conveniently. This positioning effect will be better than prior procedure, only by hands. Then, to push the handle (13) to make the rod (14) apart from the aperture (31), the apparatus (1) can be moved upward to connect with both tubes of the shaft, as shown in FIG. 8, for normal use of the beach umbrella.

Accordingly, the above-mentioned structure is only an exemplary of the present invention. Any modification with the same merit is still claimed in this application, such as using another structure of spring and positioning apparatus for connecting the tubes of the shaft of the beach umbrella that has similar effect to the present invention.

I claim:

1. A positioning structure of a beach umbrella comprising:
   a shaft including an upper tube and a lower tube, said upper and lower tubes each having several interval positioned apertures thereon;
   a positioning apparatus connecting said upper and lower tubes together, said positioning apparatus including a flat plate and a joint with a spring on a side thereof,
   said spring providing an elastic force;
   a handle coupled to said spring and being biased thereby;
   a rod coupled to a top of the handle and biased to extend into a central hole of the positioning apparatus;
   and the upper tube and the lower tube being received in the central hole of the positioning apparatus,
   the rod penetrating a respective aligned pair of said apertures of said upper and lower tubes and being positioned at a certain position in securement therewith.

2. A positioning structure of a beach umbrella as claimed in claim 1, wherein the rod on the handle can select different apertures on said upper and lower tube of the shaft to determine the height of the umbrella.

3. A positioning structure of a beach umbrella as claimed in claim 1, wherein the lower tube of the shaft can be inserted into ground by foot force acting on the flat plate firmly.

* * * * *